United States Patent
Curello et al.

(10) Patent No.: US 8,636,826 B2
(45) Date of Patent: Jan. 28, 2014

(54) HYDROGEN MEMBRANE SEPARATOR

(75) Inventors: Andrew J. Curello, Hamden, CT (US); Michael Curello, Cheshire, CT (US); Constance R. Stepan, Oxford, CT (US)

(73) Assignee: Societe BIC, Clinchy Cedex (FR)

( * ) Notice: Subject to any disclaimer, the term of this patent is extended or adjusted under 35 U.S.C. 154(b) by 699 days.

(21) Appl. No.: 12/829,827

(22) Filed: Jul. 2, 2010

(65) Prior Publication Data

US 2011/0104021 A1 May 5, 2011

Related U.S. Application Data

(63) Continuation-in-part of application No. PCT/US2009/063108, filed on Nov. 3, 2009.

(51) Int. Cl.
*B01D 53/22* (2006.01)
*B01J 19/00* (2006.01)

(52) U.S. Cl.
USPC ............... 95/45; 95/55; 96/4; 96/7; 96/10; 96/11; 422/129; 422/240; 423/648.1; 423/651; 48/61

(58) Field of Classification Search
USPC ............... 96/4, 7, 9, 11, 10; 95/53, 55, 45; 422/129, 240; 423/648.1, 651; 48/61
See application file for complete search history.

(56) References Cited

U.S. PATENT DOCUMENTS

| | | | |
|---|---|---|---|
| 3,416,985 A * | 12/1968 | Dounoucos | 96/7 |
| 3,447,286 A | 6/1969 | Dounoucos | |
| 4,024,229 A | 5/1977 | Smith et al. | |
| 4,699,637 A | 10/1987 | Iniotakis et al. | |
| 4,797,259 A | 1/1989 | Matkovich et al. | |
| 5,131,927 A | 7/1992 | Bikson et al. | |
| 5,997,594 A | 12/1999 | Edlund et al. | |
| 6,231,831 B1 | 5/2001 | Autenrieth et al. | |
| 6,319,306 B1 | 11/2001 | Edlund et al. | |
| 6,458,189 B1 | 10/2002 | Edlund et al. | |
| 7,648,792 B2 * | 1/2010 | Kaschmitter et al. | 429/424 |
| 2003/0198862 A1 | 10/2003 | Struthers | |
| 2006/0042210 A1 * | 3/2006 | Dallas et al. | 55/524 |
| 2006/0278287 A1 * | 12/2006 | Fielden et al. | 137/806 |
| 2008/0102347 A1 | 5/2008 | Blunk | |
| 2008/0216906 A1 * | 9/2008 | Curello et al. | 137/614.03 |
| 2008/0225378 A1 | 9/2008 | Weikert et al. | |
| 2008/0248368 A1 | 10/2008 | Dadheech et al. | |
| 2009/0142564 A1 * | 6/2009 | Plissonnier et al. | 428/220 |
| 2009/0313813 A1 * | 12/2009 | Sato et al. | 29/623.5 |

OTHER PUBLICATIONS

International Search Report issued in connection with the corresponding International Application No. PCT/US2011/041227 on Jan. 19, 2012.

* cited by examiner

*Primary Examiner* — Jason M Greene
(74) *Attorney, Agent, or Firm* — The H.T. Than Law Group

(57) ABSTRACT

The present application is directed to a hydrophobic membrane assembly (28) used within a gas-generating apparatus. Hydrogen is separated from the reaction solution by passing through a hydrophobic membrane assembly (28) having a hydrophobic lattice like member (36) disposed within a hydrogen output composite (32) further enhancing the ability of the hydrogen output composite's ability to separate out hydrogen gas and prolonging its useful life.

46 Claims, 3 Drawing Sheets

HYDROGEN MEMBRANE SEPARATOR

CROSS REFERENCE TO RELATED PATENT APPLICATION

The present patent application is a continuation-in-part of international patent application serial no. PCT/US2009/063108 filed on 3 Nov. 2009 designating the United States. This application is incorporated herein by reference in its entirety.

FIELD OF THE INVENTION

The invention relates generally to fuel supplies for fuel cells. In particular, the invention relates to hydrophobic membrane assemblies for separating hydrogen gas from reaction fluids.

BACKGROUND OF THE INVENTION

Fuel cells are devices that directly convert chemical energy of reactants, i.e., fuel and oxidant, into direct current (DC) electricity. A common fuel for fuel cells is hydrogen gas, which can be stored in compressed form or stored in a hydrogen absorbent material, e.g., lanthanum nickel alloy, $LaNi_5H_6$, or other hydrogen absorbent metal hydrides. Hydrogen can also be produced on demand by chemical reaction between a chemical metal hydride, such as sodium borohydride, $NaBH_4$, and water or methanol.

In a chemical metal hydride reaction, a metal hydride such as $NaBH_4$, reacts as follows to produce hydrogen:

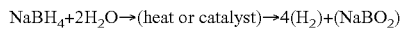

$$NaBH_4 + 2H_2O \rightarrow (\text{heat or catalyst}) \rightarrow 4(H_2) + (NaBO_2)$$

Half-Reaction at the Anode:

$$H_2 \rightarrow 2H^+ + 2e^-$$

Half-Reaction at the Cathode:

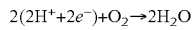

$$2(2H^+ + 2e^-) + O_2 \rightarrow 2H_2O$$

Suitable catalysts for this reaction include cobalt, platinum and ruthenium, and other metals. The hydrogen fuel produced from reforming sodium borohydride is reacted in the fuel cell with an oxidant, such as $O_2$, to create electricity (or a flow of electrons) and water by-product. Sodium borate ($NaBO_2$) by-product is also produced by the reforming process. A sodium borohydride fuel cell is discussed in U.S. Pat. No. 4,261,956, which is incorporated by reference herein in its entirety. The hydrogen produced by chemical metal hydrides may be compressed or stored in a metal hydride hydrogen absorbent material for later consumption by a fuel cell.

One disadvantage of the known hydrogen gas generators using chemical hydride as fuel is that the separation of the hydrogen gas resulting from the reaction is not always complete. Over time, water, water vapor, reaction agents, and reaction by-products may pass from the gas generator to the fuel cell reducing the fuel cell's efficiency and operational life.

Accordingly, there is a desire to obtain a hydrogen gas generator apparatus with a membrane assembly that effectively separates the resulting hydrogen gas from the reaction solutions.

SUMMARY OF THE INVENTION

The present invention is directed to a hydrophobic membrane assembly for use within a gas-generating apparatus within the fuel supply for a fuel cell. The present invention is also directed to reaction chambers, gas-generating apparatuses, and/or fuel supplies incorporating the hydrophobic membrane assemblies of the current invention.

One aspect of the invention is directed to a gas-generating apparatus with a reaction chamber; a fuel mixture, which reacts to produce a gas in the presence of a catalyst, within the reaction chamber. The reaction chamber contains a hydrogen output composite of a hydrophobic lattice structure disposed between two gas-permeable, substantially liquid-impermeable membranes, and the gas produced by the fuel mixture reaction flows through one or both of the membranes and around the lattice structure. The hydrophobic lattice structure may have a static contact angle with water of greater than about 120°, and possibly even greater than about 150°. Also, the hydrophobic lattice structure may have a surface energy of less than about 40 mJ/m², and that surface energy may have a dispersive energy component of less than about 40 mJ/m² and a polar energy component of less than about 2.0 mJ/m². The surface energy of the hydrophobic lattice structure may also be less than about 20 mJ/m², and that surface energy may have a dispersive energy component of less than about 20 mJ/m² and a polar energy component of less than about 1.0 mJ/m². Further, the surface energy of the hydrophobic lattice structure may be less than about 10 mJ/m², and that surface energy may have a dispersive energy component of less than about 10 mJ/m² and a polar energy component of less than about 0.5 mJ/m². The hydrophobic lattice structure may also have a contact angle hysteresis measurement of less than about 40°, possibly even less than about 20°, or further still less than about 10°.

In this aspect of the invention, the hydrophobic lattice structure may be a polymer, and the polymer may be poly (tetrafluorethene), polypropylene, polyamides, polyvinylidene, polyethylene, polysiloxanes, polyvinylidene fluoride, polyglactin, lyophilized dura matter, silicone, rubber, and/or mixtures thereof. Preferably, the polymer may be polyvinylidene fluoride. Alternatively, the hydrophobic lattice structure may be coated with a hydrophobic coating. The hydrophobic coating may be polyethylene, paraffin, oils, jellies, pastes, greases, waxes, polydimethylsiloxane, poly(tetrafluorethene), polyvinylidene fluoride, tetrafluoroethylene-perfluoroalkyl vinyl-ether copolymer, fluorinated ethylene propylene, poly(perfluorooctylethylene acrylate), polyphosphazene, polysiloxanes, silica, carbon black, alumina, titania, hydrated silanes, silicone, and/or mixtures thereof. Preferably, the hydrophobic coating may be poly(tetrafluorethene), tetrafluoroethylene-perfluoroalkyl vinyl ether copolymer, fluorinated ethylene propylene, poly(perfluorooctylethyl acrylate), or polyphosphazene. Further still, the hydrophobic lattice structure may be coated with a surfactant, and the surfactant may be perfluorooctanoate, perfluorooctanesulfonate, ammonium lauryl sulfate, sodium laureth sulfate, alkyl benzene sulfonate, a sulfated or sulfonated fatty material, salts of sulfated alkyl aryloxypolyalkoxy alcohol, alkylbenzene sulfonates, sodium dodecyl benzenesulfonate, fluorosurfactants, sodium lauryl sulfate, sulfosuccinate blend, sodium dioctyl sulfosuccinate, sodium sulfosuccinate, sodium 2-ethylhexyl sulfate, ethoxylated acetylenic alcohols, high ethylene oxide octyl phenols, high ethylene oxide nonyl phenols, high ethylene oxide linear and secondary alcohols, ethoxylated amines of any ethylene oxide length, ethoxylated sorbitan ester, random EO/PO polymer on butyl alcohol, water soluble block EO/PO copolymers, sodium lauryl ether sulfate, and/or mixtures thereof. The surfactant may optionally include a cross-linking agent as well.

Additionally, the hydrophobic lattice structure may have a roughened surface. Preferably, the hydrophobic lattice structure exhibits Cassie-Baxter behavior.

The gas generating apparatus may have a second hydrophobic lattice structure between the reaction chamber and the hydrogen output composite. Also, the gas generating apparatus may also have a coarse filter between the catalyst and the hydrogen output composite, and preferably this coarse filter may be hydrophobic.

Another aspect of the present invention is directed to a gas-generating apparatus having a reaction chamber, a fuel mixture, which reacts to produce a gas in the presence of a catalyst, within the reaction chamber. The reaction chamber comprises a hydrogen output composite having a lattice structure disposed between two gas-permeable, substantially liquid-impermeable membranes, at least one of which has had its hydrophobicity enhanced, and the gas produced by the fuel mixture reaction flows through one or both of the membranes and around the lattice structure. Preferably, both gas-permeable, substantially liquid-impermeable membranes hydrophobicity may be enhanced. The hydrophobicity of the gas-permeable, substantially liquid-impermeable membrane may be enhanced by coating the gas-permeable, substantially liquid-impermeable membrane with a hydrophobic coating. The hydrophobic coating may be polyethylene, paraffin, oils, jellies, pastes, greases, waxes, polydimethylsiloxane, poly(tetrafluorethene), polyvinylidene fluoride, tetrafluoroethylene-perfluoroalkyl vinyl-ether copolymer, fluorinated ethylene propylene, poly(perfluorooctylethylene acrylate), polyphosphazene, polysiloxanes, silica, carbon black, alumina, titania, hydrated silanes, silicone, and/or mixtures thereof. Preferably, the hydrophobic coating may be poly(tetrafluorethene), tetrafluoroethylene-perfluoroalkyl vinyl ether copolymer, fluorinated ethylene propylene, poly(perfluorooctylethyl acrylate), or polyphosphazene. Alternatively, the hydrophobicity of the gas-permeable, substantially liquid-impermeable membrane may be enhanced by coating the gas-permeable, substantially liquid-impermeable membrane with a surfactant. The surfactant may be perfluorooctanoate, perfluorooctanesulfonate, ammonium lauryl sulfate, sodium laureth sulfate, alkyl benzene sulfonate, a sulfated or sulfonated fatty material, salts of sulfated alkyl aryloxypolyalkoxy alcohol, alkylbenzene sulfonates, sodium dodecyl benzenesulfonate, fluorosurfactants, sodium lauryl sulfate, sulfosuccinate blend, sodium dioctyl sulfosuccinate, sodium sulfosuccinate, sodium 2-ethylhexyl sulfate, ethoxylated acetylenic alcohols, high ethylene oxide octyl phenols, high ethylene oxide nonyl phenols, high ethylene oxide linear and secondary alcohols, ethoxylated amines of any ethylene oxide length, ethoxylated sorbitan ester, random EO/PO polymer on butyl alcohol, water soluble block EO/PO copolymers, sodium lauryl ether sulfate, and/or mixtures thereof. Optionally, the surfactant may include a cross-linking agent.

Further, the substantially liquid-impermeable membrane may have an exterior surface that has been roughened to enhance its hydrophobicity. Preferably this surface exhibits Cassie-Baxter behavior.

The hydrophobicity of the substantially liquid-impermeable membrane may be enhanced by about 10%.

A further aspect of the current invention is directed to a gas generating apparatus having a reaction chamber, a fuel mixture, which reacts to produce a gas in the presence of a catalyst, within the reaction chamber. The reaction chamber has a hydrogen output composite with a lattice structure disposed between two gas-permeable, substantially liquid-impermeable membranes, and the gas produced by the fuel mixture reaction flows through one or both of the membranes and into the lattice structure. The surface tension of the fuel mixture in this aspect of the current invention is greater than the surface energy of the gas-permeable, substantially liquid-impermeable membranes. The surface tension of the fuel mixture is greater than 73 dynes/cm. Alternatively, the surface tension of the fuel mixture may be at least double that of the surface energy of the gas-permeable, substantially liquid-impermeable membrane.

A further aspect of the present invention is directed to a gas generating apparatus having a reaction chamber, a fuel mixture, which reacts to produce a gas in the presence of a catalyst, within the reaction chamber. The reaction chamber has a hydrogen output composite having a lattice structure disposed between two gas-permeable, substantially liquid-impermeable membranes, and the gas produced by the fuel mixture reaction flows through one or both of the membranes and into the lattice structure. In this aspect of the invention, a super acidic filter is located downstream of the lattice structure to substantially remove basic contaminants from the produced gas. The super acidic filter may be a perfluorinated sulfonic acid polymer. Also, the super acidic filter may remove greater than 90% of the basic contaminants from the produced gas.

BRIEF DESCRIPTION OF THE DRAWINGS

In the accompanying drawings, which form a part of the specification and are to be read in conjunction therewith.

DETAILED DESCRIPTION OF THE INVENTION

Figure 1:
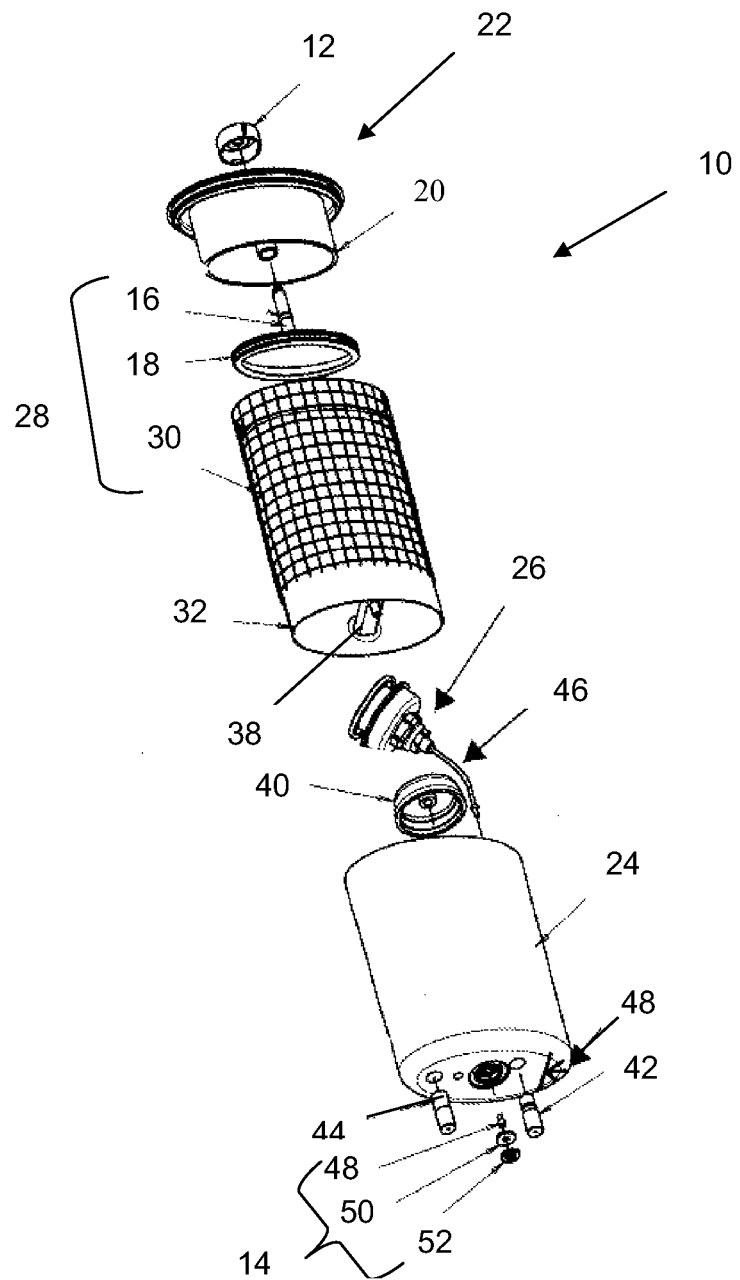
FIG. 1 is an exploded view of one embodiment of the inventive hydrogen-generating apparatus.

As illustrated in the accompanying drawings and discussed in detail below, the present invention is directed to hydrophobic membrane assembly for a fuel supply or gas generator which produces hydrogen for use in fuel cells.

The fuel supplies used with the membrane assembly contain a fuel mixture and a catalyst. This fuel mixture is generally the solution formed by dissolving a solid fuel component in a liquid fuel component.

The term "solid fuel" as used herein includes all solid fuels that can be reacted to produce hydrogen gas, and includes, but is not limited to, all of the suitable chemical hydrides described herein and in WO2010-051557 A1, including lithium hydride, lithium borohydride, sodium hydride, potassium hydride, potassium borohydride, lithium aluminum hydride, combinations, salts, and derivatives thereof. WO2010-051557 A1 is incorporated herein by reference in its entirety. Preferably the solid fuel component is a chemical metal hydride such as sodium borohydride. The solid fuel component may include other chemicals, such as solubility-enhancing chemicals or stabilizers, such as soluble metal hydroxides, and preferably includes sodium hydroxide. Other usable stabilizers include potassium hydroxide or lithium hydroxide, among others.

The term "liquid fuel" as used herein includes all liquid fuels that can be reacted to produce hydrogen gas, and includes, but is not limited to, suitable fuels described herein and in WO2010-051557 A1, including water, alcohols and additives, catalysts, and mixtures thereof. Preferably, the liquid fuel, such as water or methanol, reacts with the solid fuel in the presence of catalyst to produce hydrogen. The liquid fuel may also include additives, stabilizers, or other reaction enhancers, such as sodium hydroxide as a stabilizer, a polyglycol as a surfactant, or many others.

The catalyst may be platinum, ruthenium, nickel, cobalt, and other metals including those disclosed in WO2010-051557 A1 and derivatives thereof. The preferred catalysts include cobalt chloride or ruthenium chloride, or both. Another preferred catalyst is a compound containing cobalt and boron. In the presence of the catalyst, the fuel mixture reacts to produce hydrogen. A preferred catalyst system is discussed in International Application No. PCT/US2009/0069239, which is incorporated by reference in its entirety.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply used with the membrane assembly of the present invention can also be used to produce fuels that are not used in fuel cells. These applications can include, but are not limited to, producing hydrogen for micro gas-turbine engines built on silicon chips, discussed in "Here Come the Microengines," published in The Industrial Physicist (December 2001/January 2002) at pp. 20-25. As used in the present application, the term "fuel cell" can also include microengines.

The inventive hydrophobic membrane can be used with any known hydrogen generators. Suitable known hydrogen-generating apparatus are disclosed in commonly-owned, U.S. Pat. Nos. 7,674,540 and 7,481,858, U.S. Patent Application Publication No. US2006-0174952 A1, International Publication No. WO2010-051557 A1 and International Application No. PCT/US2009/0069239 with which the inventive hydrophobic membrane assembly may be used. The disclosures of these references are incorporated by reference herein in their entireties.

Figure 2:
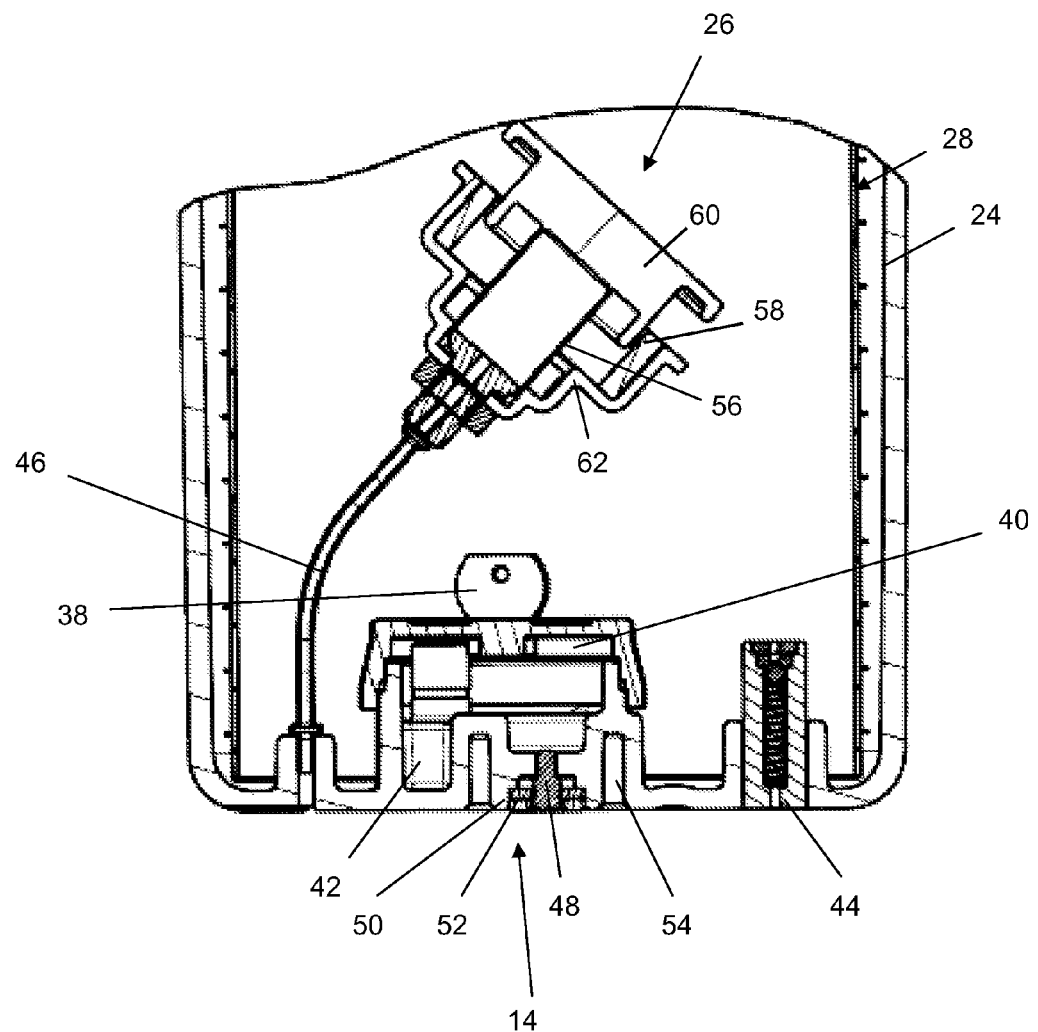
FIG. 2 is a partial cross-sectional view of the inventive hydrogen-generating apparatus depicted in FIG. 1.
Figure 3:
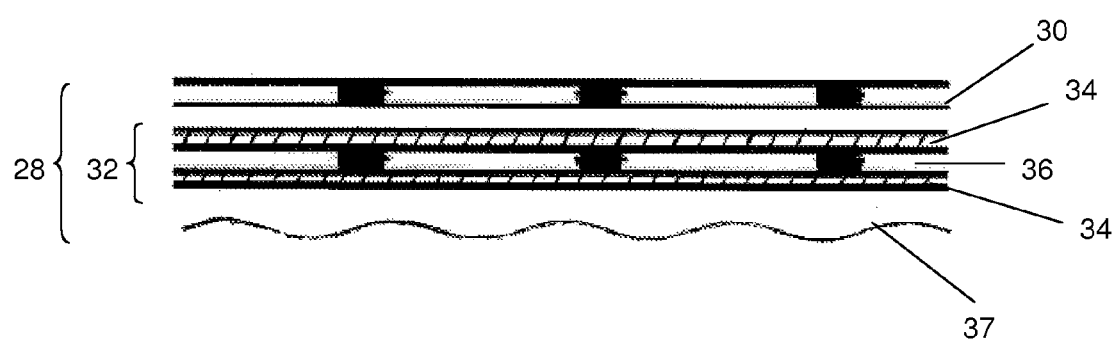
FIG. 3 is a partial cross sectional view of the inventive hydrogen output composite of the present invention.

FIGS. 1-3 illustrate a representative hydrogen-generating apparatus 10 in accordance with the present invention. Hydrogen generating apparatus 10, as illustrated, is operated by pushing lock knob 12 inwards or towards outlet valve 14, which is located on the opposite end of hydrogen generator 10. As shown, lock knob 12 is attached to seal piston 16, which moves the seal 18 towards an open position when lock knob 12 is depressed. This releases the solid fuel contained within the chamber 20 inside cap 22. The solid fuel then dissolves within liquid fuel present within the interior of container 24 to form an aqueous fuel mixture, discussed above. This aqueous fuel mixture contacts a catalyst within reactor buoy 26 and reacts to produce hydrogen. As described in detail in WO2010-051557 A1, reactor buoy 26 opens and closes depending on the internal pressure of hydrogen generator 10 and a reference pressure to control access to the catalyst to control the production of hydrogen. The produced hydrogen gas permeates into membrane assembly 28 and is transported out of container 12 and hydrogen generator 10, discussed below.

As illustrated, membrane assembly 28 comprises outer lattice 30 and hydrogen output composite 32. Hydrogen outlet composite 32 comprises in this preferred embodiment two layers of hydrogen permeable membranes 34 positioned on either sides of internal lattice 36. Hydrogen permeable membranes allow hydrogen to pass through but substantially exclude liquids. Suitable hydrogen permeable membranes include any substantially liquid-impermeable, gas-permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or combinations thereof. Commercially available suitable hydrogen permeable membranes include GORE-TEX®, CELGARD® and SURBENT® polyvinylidene fluoride (PVDF). Additionally, or alternatively, the hydrogen permeable membrane may include any of the gas-permeable substantially liquid-impermeable materials disclosed in U.S. Pat. No. 7,147,955, incorporated herein by reference.

Hydrogen permeable membranes 34 are preferably sealed together around internal lattice 36 to form the multilayer hydrogen output composite 32. Internal lattice 36 minimizes the possibility that the two hydrogen permeable membranes 34 would contact each other or seal together to minimize the flow of hydrogen. Outer lattice 30 is used to minimize contact between hydrogen output composite 32 with container 24, which could reduce the flow rate of hydrogen into hydrogen output composite 32. Outer lattice 30 and internal lattice 36 are preferably flexible. In a preferred embodiment, multilayer hydrogen output composite 32 is constructed as a flat structure, as best shown in FIG. 3, with hydrogen conduit 38 attached to one side of hydrogen output composite 32. A coarse filter 37, such as a corrugated paper or nonwoven or woven on reactor side of the membrane can be placed on top of the flat structure to minimize the contact between hydrogen output composite 32 and any solids that may precipitate from the fuel solution. The entire flat structure can simply be rolled up and inserted into container 24. Hydrogen conduit 38 is in fluid communication with the interior of hydrogen output composite 32 and with hydrogen chamber 40.

The hydrogen gas is separated from the reaction solution when it passes through hydrogen permeable membranes 34 into the interior of hydrogen output composite 32, where the hydrogen passes through and/or along internal lattice 36 to hydrogen conduit 38 to flow out of hydrogen output composite 32. Hydrogen conduit 38 is connected to hydrogen chamber 40, and hydrogen collects in chamber 40. Hydrogen chamber 40 can contain a super acid to filter out unwanted alkalis. Outlet valve 14 is connected to hydrogen chamber 40 and is also connected to a fuel cell (not shown). First relief valve 42 is provided to hydrogen chamber 40 to vent hydrogen when the pressure within chamber 40 is above a predetermined threshold level. Second relief valve 44 is provided to chamber 24 to vent when the pressure in that chamber is above another predetermined threshold level.

Buoy 26 is connected by tube 46 to outside atmosphere so that atmospheric pressure can serve as the reference pressure, as best shown in FIG. 2. Tube 46 may be rigid and hold buoy 26 vertically or at an angle of about 45°, preferably between about 35° and about 55°. These angles preferably allow trapped gas to move away from buoy 26 when buoy opens or closes. Tube 46 preferably is connected to surface channels 48, which are depressions formed on an outside surface of chamber 24. Multiple surface channels 48 ensure that tube 46 remains open to atmosphere even when the user's finger or debris blocks or partially blocks tube 46. Channels 48 can be disposed on the bottom of chamber 24, as shown, or on the side of chamber 24.

Outlet valve 14 can be any valve capable of controlling hydrogen flow, and preferably are the valves described in international patent application publication nos. WO2009-026441 and WO2009-026439, which are incorporated herein by reference in their entireties. Preferably, outlet valve 14 comprises center post 48, which is substantially immovable relative to chamber 24, and can be fixedly mounted to the bottom of chamber 24, as best shown in FIG. 2. Seal 50, which could be an O-ring or a flat washer, surrounds center post 48 and provides a seal for hydrogen chamber 40. Retainer 52 maintains or locks seal 50 in its proper place. Other suitable outlet valves include, but are not limited to, valves disclosed in U.S. Pat. Nos. 7,537,024, 7,059,582, 7,617,842 and U.S. published patent applications nos. US2006-0174952 and US2010-0099009. These references are also incorporated herein by reference in their entireties.

To render outlet valve 14 more difficult to operate by unintentional users or to reduce the possibility of connecting hydrogen generator 10 to incompatible machineries, a matching pre-pilot blind bore 54 is provided around outlet valve 14. To open valve 14, a corresponding or mating valve should have a cylindrical member that fits around center post 48 and inside retainer 52 to open seal 50 and an annular/concentric member that fits within pre-pilot bore 54. Other mechanisms to ensure difficult operation by unintended users and/or incompatible machineries are disclosed in U.S. published patent application nos. US 2005-0074643, US2008-0145739, US2008-0233457 and US2010-0099009, which are incorporated herein by reference in their entireties.

Generally, lattices 30, 36 can be any lattice-like material and may be stiff or flexible. The lattice material may be a hydrophobic solid lattice, a fabric, textile, nylon knit, wick, mesh material, screen, corrugated shape, or other gas permeable structure that can serve as a base for lamination and prevent the membranes 34 from collapsing on one another. Suitable lattice materials including those positioned or inserted within a fuel bladder disclosed in co-owned U.S. Pat. No. 7,172,825, which is hereby incorporated by reference in its entirety. Hydrogen output composite 32 filters produced hydrogen gas out of the fuel mixture and convey the produced gas to hydrogen outlet 38 and to outlet valve 14. By constructing the hydrogen separator in this manner which is also discussed in WO2010-051557 A1, membrane assembly 28 is inserted in the middle of the solution allowing the pressure to be equal on both sides with a differential pressure resulting in compression.

The inventors of the present invention observed that after a period of time liquid fuel and/or liquid byproduct, which contains water, entered the hydrogen output composite. The water appeared to contain additives, such as potassium hydride, KOH, or sodium hydride, NaOH, and reaction by-products such as potassium borates, $KBO_2$, and sodium borates, $NaBO_2$. These contaminants can detrimentally affect the polymer electrolyte or the MEA of the fuel cell when they pass through outlet valve 14 with the hydrogen gas. After considerable effort and quite unexpectedly, without being bound to any particular theory, it was determined that lattice 36 may have been responsible for the entry of the liquid fuel into hydrogen output composite 32. The inventors believe that interior lattice 36 was hydrophilic in nature when compared to hydrogen permeable, substantially liquid impermeable membranes 34. When interior lattice 36 was in contact with hydrogen permeable, substantially liquid impermeable membrane 34, it may have caused or encouraged through the process of osmotic drag water or liquid fuel with the contaminants to go through the pores of hydrogen permeable, substantially liquid impermeable membrane 34. It is also believed that the internal pressure of chamber 24, especially when hydrogen is being produce also encourages liquid fuel to go through membranes 34. The liquid fuel with the contaminants can accumulate within the hydrogen output composite 32.

The current invention relates to a hydrophobic hydrogen output composite 32, and preferably a hydrophobic membrane assembly 28.

The hydrophobicity of a solid (or wettability) depends on the forces of interaction between water, the surface and the surrounding air. See J. C. Berg, "Wettability", Marcel Dekker, New York, 1993 and A. W. Adamson, "Physical Chemistry of Surfaces", Wiley. The forces of interaction between water and air are surface tension, $\gamma_{LV}$. Similarly, a surface energy, $\gamma_{SV}$, is defined as the forces between a solid and the surrounding air and interface tension, $\gamma_{LS}$, is defined as the forces between the solid and water. For a drop of liquid in equilibrium on a surface, Young's equation stipulates that $\gamma_{SV} - \gamma_{LS} = \gamma_{LV} \cos \theta$, where $\theta$ is the contact angle of the drop of water in relation to the surface. Young's equation also shows that, if the surface tension of the liquid is lower than the surface energy, the contact angle is zero and water, wets the surface. Additionally, the water may partially wet the surface (contact angle greater than 0°). If the contact angle is between 0° and 90° the surface is considered hydrophilic; and if the contact angle is greater than 90° the surface is considered hydrophobic. And in certain instances, super-hydrophobic materials, such as lotus leaves, have been noted as having a static water contact angle above 150°. In particular, the static contact angle of a substrate can be measured using a contact angle goniometer and can be measured by methods known to those skilled in the art including the sessile drop method (static and dynamic), Wihelmy method (dynamic and single-fiber), and powder contact angle method.

The surface energy of a solid, the excess energy available at the surface of a solid as compared to its bulk, is determinative of the solids hydrophilic or hydrophobic state. Matter seeks to be in a low energy state and chemical bonds reduce energy. Thus, surfaces that have high surface energies tend to be hydrophilic since those surfaces will initiate binding with the hydrogen molecules within water. Hydrophobic materials have lower surface energies and are unable to form hydrogen bonds with water, and water repels the hydrophobe in favor of binding with itself. Young's equation illustrates this point.

The surface energy of a solid depends on several factors (J. P. Renaud and P. Dinichert, 1956, "Etats de surface et etalement des huiles d'horlogerie", Bulletin SSC III page 681): the chemical composition and crystallographic structure of the solid, and in particular of its surface, the geometric characteristics of the surface and its roughness (and therefore the defects and/or the state of polishing), and the presence of molecules physically adsorbed or chemically bonded to the surface, which can easily mask the solid and significantly modify its surface energy.

The Owens Wendt Theory, also known as the harmonic mean method, can be used to measure the surface energy of a solid. Owens, D. K.; Wendt, R. G. "Estimation of the surface force energy of polymers", J. Appl. Polym. Sci. 1969, 51, 1741-1747. This theory posits that the surface energy of the surface is the sum of its polar and dispersive components. The polar component accounts for dipole-dipole, dipole-induced, hydrogen bonding and other site specific interactions between a solid and liquid. The dispersive component accounts for surface interactions from Van der Waals and other non-site specific interactions between a solid and liquid. The model is based on two fundamental equations which describe the surface interactions between solids and liquids: Good's Equation $(\sigma_{SL} = \sigma_S + \sigma_L - 2(\sigma_L^D \sigma_S^D)^{1/2} - 2(\sigma_L^P \sigma_S^P)^{1/2})$ and Young's Equation $(\sigma_S = \sigma_{SL} + \sigma_L \cos \theta)$. The dispersive component of the surface tension of the wetting liquid is $\sigma_L^D$; the polar component of the surface tension of the wetting liquid is $\sigma_L^P$; the dispersive component of the surface energy of the solid is $\sigma_S^D$; and the polar component of the surface energy of the solid is $\sigma_S^P$. Combining Good's and Young's equation produces the following equation: $\sigma_L(\cos \theta+1)/2 (\sigma_L^D)^{1/2}=(\sigma_S^P)^{1/2}((\sigma_L^P)^{1/2}/(\sigma_L^D))+\sigma_S^D)^{1/2}$. The equation the linear form of $y=mx+b$, whereby $y=\sigma_L(\cos \theta+1)/2(\sigma_L^D)^{1/2}$; $m=(\sigma_S^P)^{1/2}$; $x=(\sigma_L^P)^{1/2}/(\sigma_L^D)$; $b=(\sigma_S^D)^{1/2}$.

The polar and dispersive components of the wetting liquids are known in the literature. A series of replicate contact angles are measured for each of at least two wetting liquids that include, but are not limited to, diiodomethane, benzyl alcohol, ethylene glycol, formamide and water. The y's are plotted as a function of x's and the polar component of the surface energy, $\sigma_S^P$, is equivalent to the square root of the slope, m, and the dispersive component of the surface energy, $\sigma_S^D$, is equivalent to the square root of the y-intercept, b.

Additionally, the surface energy of a solid may be measured using contact angle hysteresis. To make this measurement a pipette injects a liquid onto a solid, and the liquid forms a contact angle. The pipette then injects more liquid, the droplet will increase in volume and its contact angle will increase, but its three phase boundary will remain stationary until it suddenly advances outward. The contact angle the droplet had immediately before advancing outward is termed the advancing contact angle. The receding contact angle is now measured by pumping the liquid back out of the droplet. The droplet will decrease in volume, the contact angle will decrease, but its three phase boundary will remain stationary until it suddenly recedes inward. The contact angle the droplet had immediately before receding inward is termed the receding contact angle. The difference between advancing and receding contact angles is termed contact angle hysteresis and can be used to characterize surface heterogeneity, roughness, mobility, and wettability. Preferably the contact angle hysteresis should be relatively small for a hydrophobic surface; and for a super hydrophobic surface should be less than 5°.

The hydrophobic membrane assembly 28 of the current invention preferably comprises a hydrophobic interior lattice 36 and optionally hydrophobic outer lattice 30. Additionally, the hydrophobicity of membrane 34 may be increased, and/or the surface tension of the reaction solution with respect to the surface of membrane 34 may be increased.

In accordance with one embodiment of the invention, the lattice-like material is made of hydrophobic materials. A hydrophobic material suitable for the current invention may be determined by at least one, or more, of the following measures: static water contact angle, surface energy, and contact angle hysteresis. If the static water contact angle is used, the static water contact angle should be greater than 90°, preferably it is greater than 120°, and most preferably greater than 150°. If surface energy is used, the surface energy of the lattice materials 30, 36 should be less than 40 mJ/m², more preferably less than 20 mJ/m², and most preferably less than 10 mJ/m². The surface energies may be further evaluated on their dispersive and polar energy components. In particular, the polar energy component of the surface energy may be less than about 5%, less than about 2.5%, less than about 1%, preferably less than 0.4%, and most preferably less than 0.1%. For example in the instance where the surface energy is less than 40 mJ/m², preferably the dispersive energy component is less than 40 mJ/m² and the polar energy component is less than 2.0 mJ/m². Similarly, where the surface energy of lattice 36, 30 is less than 20 mJ/m², preferably the dispersive energy component is less than 20 mJ/m² and the polar energy component is less than 1 mJ/m². Properties of Polymers by D. W. Van Krevelen (Elsevier 1990) disclose various polymers, their surface energies, and the dispersive and polar components of their surface energies and are hereby incorporated in its entirety by reference. Also, where the surface energy of lattice 36, 30 is less than 10 mJ/m², preferably the dispersive energy component is less than 10 mJ/m² and the polar energy component is less than 0.5 mJ/m². Where the measure is contact angle hysteresis, the measurement should be less than about 40°, more preferably less than about 20°, most preferably less than about 10°. Given that hydrophobic membrane assembly 28 is submerged in an aqueous solution, the surface energy and contact angle hysteresis measurements are the preferred determinants of whether a material can be considered hydrophobic.

Preferably, the lattice 36, 30 is as hydrophobic as the membrane 34. As noted above, Cellgard™ is an example of a material suitable for use as membrane 34 and has a contact angle of about 120°, a surface energy of about 22.04 (±0.16) mJ/m² with a dispersive energy component of about 22.00 (±0.15) mJ/m² and a polar energy component of about 0.04 (±0.01) mJ/m², and a contact angle hysteresis measurement of about 30°. More preferably, lattice 36, 30 is more hydrophobic than membrane 34, i.e. lattice 36, 30 has a higher static contact angle measurement, a surface energy that is less than the surface energy of membrane 34, and/or a contact angle hysteresis measurement that is less than the contact angle hysteresis measurement for membrane 34.

Suitable hydrophobic materials for the manufacture of the lattice include hydrophobic substrates such as ceramics, plastics, polymers, glasses, fibers, nonwovens, wovens, textiles, fabrics, carbon and carbon fibers, ion exchange resins, metals, alloys, wires, and meshes. It is preferred, that the hydrophobic materials be compatible with the reaction solution and not inhibit the ability of hydrogen output composite 32 to allow hydrogen gas to pass through. Suitable hydrophobic materials include, but are not limited to, hydrophobic polymeric materials such as poly(tetrafluorethene) (PTFE), polypropylene (PP), polyamides, polyvinylidene, polyethylene, polysiloxanes, silicone, rubber, polyglactin (VICRY®), lyophilized dura mater, or combinations thereof. Preferably, the hydrophobic material is PTFE better known as TEFLON® sold by Dupont. More preferably, materials suitable for membrane 34, such as, GORETEX®, CELGARD® and SURBENT® may be used as well provided that internal lattice 36 and membrane 34 will not seal together an impede the flow of hydrogen if they are made of the same material. Additionally, superhydrophobic polymeric materials including but not limited to superhydrophobic linear low density polyethylene as described in Yuan et al. "Preparation and characterization of self-cleaning stable superhydrophobic linear low-density polyethylene." *Sci. Technol. Adv. Mater.* 9 (2008), may be used as well.

In an alternative embodiment, the lattice-like materials may be made further hydrophobic or alternatively a hydrophilic base material may be made hydrophobic through coating with a hydrophobic coating or super hydrophobic coating. Solutions used to coat the lattice like material may include, but are not limited to, polyethylene, paraffin, oils, jellies, pastes (TEFLON® and carbon paste), greases, waxes, polydimethylsiloxane, PTFE, polyvinylidene fluoride, tetrafluoroethylene-perfluoroalkyl vinyl-ether copolymer, fluorinated ethylene propylene (FEP), poly(perfluorooctylethylene acrylate) (FMA), polyphosphazene, polysiloxanes, silica, carbon black, alumina, titania, hydrated silanes, silicone, and/or mixtures thereof. Preferably, highly water repellent material such as PTFE, tetrafluoroethylene-perfluoroalkyl vinyl ether copolymer (PFA), fluorinated ethylene propylene (FEP), poly (perfluorooctylethyl acrylate) (FMA), polyphosphazene, and/or mixtures thereof, is used to coat the lattice like material 36, 30. Methods of forming superhydrophobic coatings, and applying superhydrophobic coatings such as those disclosed in International Publication Nos. WO 98/42452 and WO 01/14497, hereby incorporated by reference, are also contemplated.

Also, processes that can be used to apply the above-noted hydrophobic coatings are well known in the art and include chemical and physical coating processes. For example, the compositions can be used with solvents such as N-methyl-2-pyrrolidone and dimethyl acetamide, or as an emulsion. The coating process can be performed by any method including brush application, spray application, dipping, and screen printing. The coatings may also be done using the Sol-Gel processes. In a Sol-Gel process, the surface is coated with hydrophobic nano-particles which are included within a polymer network. The coatings are composite materials (nanocomposites) with organic and inorganic components which are produced by using Sol-Gel processes. The coating is applied by using simple dipping or spraying processes followed by a hardening process.

Additionally, a hydrophobic coating may be introduced onto the surface of lattice like material 36, 30 by plasma treatment. By this means, the hydrophobic layer may be formed at a desired thickness. By applying, for example, $CF_4$ plasma treatment to the surface, water repellency is applied to the surface of the base material.

In addition to the above-noted hydrophobic coatings, surfactants, including, but not limited to, soaps, detergents, and wetting agents may be applied to the surface of lattice like material 36, 30. Surfactants are amphiphilic: the surfactant particles contain a hydrophobic tail and hydrophilic head. Without being bound to any particular theory, it is believed that a surfactant coating on the surface of the lattice like material 36, 30 will form an additional barrier. Specifically, the surfactant particles will orient themselves so that their hydrophobic tails are in contact with the surface of the lattice like material and their hydrophilic heads are in contact with the liquid, thereby isolating the surface of lattice like material 36, 30 from the liquid fuel. Surfactants for use as coatings include, but are not limited to, ionic (anionic, cationic, or zwitterionic) or nonionic surfactants. Surfactants include, but are not limited to, perfluorooctanoate, perfluorooctanesulfonate, ammonium lauryl sulfate, sodium laureth sulfate, alkyl benzene sulfonate, a sulfated or sulfonated fatty material, salts of sulfated alkyl aryloxypolyalkoxy alcohol, alkylbenzene sulfonates, sodium dodecyl benzenesulfonate (Rhodacal LDS-10 surfactant from Rhone Poulenc), fluorosurfactants (Fluorad FC-170C surfactant available from 3M), sodium lauryl sulfate (commercially available as Sipon UB), sulfosuccinate blend (commercially available as Aerosol OTNV), sodium dioctyl sulfosuccinate (commercially available as Aerosol TO from Cytec Industries), sodium sulfosuccinate, or sodium 2-ethylhexyl sulfate (commercially available as Rhodapon BOS); ethoxylated acetylenic alcohols, such as Surfynol CT-111, high EO (ethylene oxide) octyl phenols, such as Iconol OP-10 and Triton CF-87; high EO nonyl phenols, such as Igepal CO-730 (NP-15); high EO linear and secondary alcohols, such at Tergitol 15-S-12 (secondary), Tergitol TMN 10 (90%) (linear), Neodol 1-9(linear), Neodol 25-12 (linear), and Mazawet 36 (Decyl random EO/PO; ethoxylated amines of any EO length, such as Chemeen T-10 (tallow, 10EO), Chemeen T-15, Chemeen C-15 (Coco. 15 EO), Trymeen 6640A, Tomah E-18-15 (18C, 15EO), Tomah E-18 10, and Tomah E-S-15 (Soya); ethoxylated sorbitan ester, e.g., POE 20 Sorbitan Monoleate (BASF T-Maz 80); random EO/PO polymer on butyl alcohol, such as Tergitol XJ, Tergitol XD, Tergitol XH, and Tergitol XH; other water soluble block EO/PO copolymers, such as Pluronic L61 LF, Pluronic L101, Pluronic L121, and Plurafac LF131, and Norfox LF-30 and LF-21, sodium lauryl ether sulfate and/or mixtures thereof. Further, the coating solutions of surfactants may include cross linking agents to increase the longevity and robustness of the surfactant coating. The lattice like material 36, 30 may be coated using methods described above.

Further, it is known that microstructuring a surface amplifies the natural tendency of a surface (Wenzel's equation), and in certain instances if the roughened surface can entrap vapor (such as air or other gases) the hydrophobicity of the surface may be further enhanced beyond that achieved in the Wenzel state (Cassie-Baxter equation). Thus, a hydrophobic surface becomes more hydrophobic when it is microstructured or roughened. A critical roughness factor, $rc=-1/\cos\theta$, provides insight as to when a roughened surface will exhibit Wenzel or Cassie-Baxter behavior. Preferably, roughened lattice like material 36, 30 exhibits Cassie-Baxter behavior. Further it may be useful to provide lattice like material 36, 30 with a dual/hierarchical multiscale surface structure as disclosed in Naik, V., Mukherjee, R., Majumdar, A., Sharma, A., "Super functional materials: Creation and control of wettability, adhesion, and optical effects by meso-structuring of surfaces", *Current Trends in Science*, Bangalore, Indian Academy of Sciences, pp. 129-148, 2009, hereby incorporated by reference. In addition to the above-noted means of making lattice-like material 36, 30 hydrophobic, it is also contemplated that the surface of lattice like material 36, 30 can be microstructured using methods known in the art including, but not limited to, top down approaches such as direct replication of natural water repellent surfaces via molding and templating including nanocasting, replica molding using moldable polymers, and/or creating patterns or textures on surfaces using micromachining, lithography (photolithographic, soft lithographic (nano imprint lithography, capillary force lithography, micromolding in capillaries, microtransfer molding), e-beam lithography), and plasma etching; as well as bottom up approaches such as chemical bath deposition, chemical vapor deposition, electrochemical deposition, layer-by-layer deposition via electrostatic assembly, colloidal assembly, sol-gel methods, nanosphere lithography, water droplet condensation induced pattern formation, and/or microabrasion. Preferably the microstructuring is done prior to coating with a hydrophobic material, but may be done following coating depending upon the thickness of the coating.

The above disclosure relates to lattice like material 36, 30, but it will be appreciated that the same principles and processes can be applied to other parts of hydrogen generator 10, such as coarse filter 37.

In an alternative embodiment, the hydrophobicity of membrane 34 is enhanced. This may be accomplished by coating membrane 34 with a hydrophobic coating, microsurfacing/roughening the surface of membrane 34, and/or coating the membrane 34 with a surfactant, as noted above. Further it has been noted that superhydrophobic surfaces are resistant to attachment by water-soluble electrolytes, such as acids and alkalis, and thus preferably the surface of membrane 34 is coated with superhydrophobic compounds or microstructured in accordance with the disclosure above. It is preferred that after the above noted treatments that the hydrophobicity of the membrane 34 is increased by at least 10%. In particular, the surface energy of membrane 34 decreases by at least about 10%, more preferably after modification membrane 34 has a surface energy of less than about 20 mJ/m² with a dispersive energy component of less than about 20 mJ/m² and a polar energy component of less than about 1 mJ/m², and/or a contact angle hysteresis measurement of less than 30°. Most preferably, the membrane 34 has a surface energy of less than about 10 mJ/m² with a dispersive energy component of less than about 10 mJ/m² and a polar energy component of less than about 0.5 mJ/m², and/or a contact hysteresis measurement of less than about 10°. The membrane may be coated with a hydrophobic coating or surfactant, and/or microsurfaced in addition to or alternatively to the hydrophobic lattice like material 36, 30, as noted above.

One of ordinary skill in the art will appreciate that hydrophobic membrane assembly 28 of the current invention may include three or more layers. FIG. 3 provides a diagram of hydrogen output composite 32 consisting of two membranes 34 and a lattice like material 36. However, hydrophobic membrane assembly 28 may have one or more hydrogen output composites 32 with one or more lattice like materials separating the various membrane layers of the hydrogen output composites. Preferably, the membrane assembly may be multilayered to maintain the hydrophobic nature of the membrane assembly for the useful life of the gas generating cartridge, such that if an outer layer may lose its hydrophobicity one of the inner layers will continue to prevent contaminants from being transported to the fuel cell.

Additionally, the lattice like materials in the hydrogen output composites may be cut at a bias (at an angle so that individual grids of the lattice resemble diamonds instead of boxes) so that if any water or water vapor enters into the hydrogen output composite it is guided away from output valve 14. The form of hydrophobic membrane assembly 28 may be further adapted to a similar use in other fuel supply devices. For example, the membrane 34 may be sandwiched between two or more lattice like materials 36, 30 to provide rigidity in arrangements where the membrane is not under compression forces and there is a risk that expansion forces may rupture the membrane 34.

Further, as indicated above, a liquid wets a surface when the surface tension of the liquid is less than the surface energy of the solid. Therefore, in order to enhance the hydrophobic nature of the membrane assembly 28, it may be desirable to increase the surface tension of the reaction solution. Surface tension is a property of the surface of a liquid, and is what causes the surface portion of liquid to be attracted to another surface, such as that of another portion of liquid. Surface tension is caused by cohesion (the attraction of molecules to like molecules). Since the molecules on the surface of the liquid are not surrounded by like molecules on all sides, they are more attracted to their neighbors on the surface. Thus, if the surface tension of the reaction solution is increased the solution will be less likely to break the surface tension and traverse hydrogen output composite 32.

This may be accomplished in two manners. First, certain surfactants added to the reaction solution such as alcohol-based compositions, used as anti-freezing agents, or glycols used as anti-foam agents should be used sparingly or replaced given that surfactants depress the surface tension of a solution. Alternatively, inorganic salts, such as sodium chloride, may be used to raise the surface tension of the solution. However, care must be taken that the inorganic salt will not interfere with the ongoing reaction between sodium borohydride and water.

The surface tension of the reaction solution should be greater than 73 dyne/cm, preferably greater than 100 dyne/cm. Alternatively, the surface tension of the reaction solution/fuel mixture should be at least twice the surface energy of the membrane 34, and more preferably the surface tension of the reaction solution/fuel mixture should be at least 2.5 times greater than the surface energy of the membrane 34.

As noted above, contaminants may foul the polymer electrolyte membrane of the fuel cell. In particular, basic (alkali) contaminants are known to permeate and reduce the effectiveness of polymer electrolyte membrane by neutralizing the highly acidic perfluorinated sulfonic acid polymer (NAFION® available from Dupont) used as the polymer electrolyte membrane. As a further precaution against contaminants, especially alkali contaminants such as sodium or potassium borate or sodium hydroxide, exiting fuel system 10 and fouling the fuel cell, it is preferable to locate a super acidic filter downstream of the hydrogen output composite 32. Preferably, this filter may be located within hydrogen conduit 38, hydrogen chamber 40, valve 14, within the tubing or conduit from fuel supply 10 to the fuel cell (not shown), and/or within a separate housing located between fuel supply 10 and the fuel cell. If the filter is intended to be replaceable, it is preferred that it be incorporated into the separate housing or within detachable elements of the fuel supply or the fuel cell.

The super acidic filter is made from an acidic material that in one embodiment is substantially the same material as the polymer electrolyte membrane, i.e. NAFION®. Since the super acidic filter of the current invention is located upstream of the MEA, the basic contaminants would be attracted to the filter and be removed from the hydrogen gas before the hydrogen gas reaches the MEA. The filter material can also be made from sulfonated cation-exchange ion exchange resins that are strongly acidic such as Amberlyst® from Rohm & Haas. Similar acidic filters are disclosed in U.S. Pat. Nos. 7,329,348 and 7,655,147, which are incorporated herein by reference in their entireties.

In the present embodiment, the polymer may be present as a continuous sheet (woven or non-woven), web, screen, matrix, foam, and/or gel; or alternatively may be present as discrete pieces such as nanoparticles, microbeads, and/or powders, provided that they do not impede the flow of hydrogen gas from the fuel supply 10 to the fuel cell. Filters formed of discrete pieces may be preferred given the increased surface area provided by such filter arrangements. The discrete pieces of the filter may be bound together using suitable binders that are resistant to hydrogen gas and potential contaminants. Alternatively, instead of a binder, the filter material can be contained within an open mesh fuel-resistant grid such as the matrix disclosed in U.S. Pat. No. 7,172,825, which is incorporated by reference in its entirety. Further, as noted above the acidic filter material may be contained within a separate housing, preferably made of materials resistant to hydrogen gas and potential contaminants, the separate housing may contain screens at an entrance port and an exit port to prevent the filter material from escaping the housing and to act as a diffuser to slow down the flow for ion exchange to take place. Further, the density and permeability of the acidic filter material determines the flow characteristics of the hydrogen gas through the super acidic filter.

The basic contaminants contained within the hydrogen gas are absorbed or attracted to the acidic filter material downstream of the hydrogen output composite 32 so that the hydrogen gas exiting the acidic filter has less basic contaminants than the hydrogen gas that entered the acidic filter. The acidic filter should substantially remove all basic contaminants from the hydrogen gas. About 90% of the basic contaminants may be removed, more preferably about 95% of the basic contaminants may be removed, and most preferably about 99% of the basic contaminants may be removed.

One means of monitoring the removal of basic contaminants known to those skilled in the art, includes but is not limited to, monitoring the pH level of the hydrogen gas. Although pH is the measure of acidic/basic nature of a solution it may be adapted to gases by exposing a moistened material, such as a cloth or paper, to the gas and then testing the pH of the exposed moistened material. The pH of the hydrogen gas may act as a further indicator of the removal of basic contaminants, the pH of the hydrogen gas exiting the acidic filter should be 7, neutral, indicating the removal of all basic contaminants.

In accordance with another aspect of the present invention, a sensor may be provided to ascertain the effectiveness of the acidic filter and to determine when the acidic filter should be replaced. The sensor may be arranged as disclosed in the '348 and '147 patents discussed above. A pH sensor may preferably be located downstream of the acidic filter and upstream of the MEA either within fuel supply 10 (hydrogen chamber 40 and/or valve 14), a conduit, tubing or passage, from fuel supply 10, within a separate housing that may contain acidic filter, or within the fuel cell. The pH sensor may simply consist of a damp litmus paper that changes color in response to the presence of a base placed within the fluid flow of the hydrogen gas that can be viewed from a transparent window in the fuel cell, separate housing and/or conduit to the fuel cell. A transformation in color of the litmus paper would be indicative of the need to replace the acidic filter, or fuel supply 10, where the acidic filter is integral to fuel supply 10. Further, the pH sensor may be electric in nature and connected to a controller, and is readable by the controller. The controller would periodically read the pH sensor, the controller displays a message or other signal such as a visual or audible signal, to the user to change the acidic filter, possibly at the next refill of fuel supply 10.

Co-owned and concurrently filed United States patent application Ser. No. 12/829,801 entitled "Gas Generator with Starter Mechanism and Catalyst Shield" is hereby incorporated by reference in its entirety.

One of ordinary skill in the art will appreciate that the hydrophobic membrane assembly of the present invention may be applied to other gas generating fuel supplies aside from the above disclosed chemical hydride system provided that the hydrogen gas needs to be separated from an aqueous solution. Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

We claim:

1. A gas-generating apparatus comprising:
   a reaction chamber;
   a fuel mixture within the reaction chamber, wherein the fuel mixture reacts to produce a gas in the presence of a catalyst; and
   wherein the reaction chamber contains a gas output composite which is gas permeable and liquid impermeable, said gas output composite comprises at least two gas-permeable, substantially liquid-impermeable membranes and a lattice structure separating the two membranes wherein the produced gas flows through at least one membrane into the gas output composite to be transported out of the gas-generating apparatus.

2. The gas-generating apparatus of claim 1, wherein the lattice structure is hydrophobic and has a static contact angle with water of greater than about 120°.

3. The gas-generating apparatus of claim 1, wherein the lattice structure is hydrophobic and has a static contact angle with water of greater than about 150°.

4. The gas-generating apparatus of claim 1, wherein the lattice structure is hydrophobic and has a surface energy of less than about 40 mJ/m$^2$.

5. The gas-generating apparatus of claim 4, wherein the surface energy has a dispersive energy component of less than about 40 mJ/m$^2$ and a polar energy component of less than about 2.0 mJ/m$^2$.

6. The gas-generating apparatus of claim 4, wherein the surface energy of the hydrophobic lattice structure is less than about 20 mJ/m$^2$.

7. The gas-generating apparatus of claim 6, wherein the surface energy has a dispersive energy component of less than about 20 mJ/m$^2$ and a polar energy component of less than about 1.0 mJ/m$^2$.

8. The gas-generating apparatus of claim 6, wherein the surface energy of the hydrophobic lattice structure is less than about 10 mJ/m$^2$.

9. The gas-generating apparatus of claim 8, wherein the surface energy has a dispersive energy component of less than about 10 mJ/m$^2$ and a polar energy component of less than about 0.5 mJ/m$^2$.

10. The gas-generating apparatus of claim 1, wherein the lattice structure is hydrophobic and has a contact angle hysteresis measurement of less than about 40°.

11. The gas-generating apparatus of claim 10, wherein the contact angle hysteresis measurement of the hydrophobic lattice structure is less than about 20°.

12. The gas-generating apparatus of claim 11, wherein the contact angle hysteresis measurement of the hydrophobic lattice structure is less than about 10°.

13. The gas-generating apparatus of claim 1, wherein the lattice structure is a polymer.

14. The gas-generating apparatus of claim 13, wherein the polymer comprises poly(tetrafluorethene), polypropylene, polyamides, polyvinylidene, polyethylene, polysiloxanes, polyvinylidene fluoride, polyglactin, lyophilized dura matter, silicone, rubber, and/or mixtures thereof.

15. The gas-generating apparatus of claim 13, wherein the polymer comprises polyvinylidene fluoride.

16. The gas-generating apparatus of claim 1, wherein the lattice structure is coated with a hydrophobic coating.

17. The gas-generating apparatus of claim 16, wherein the hydrophobic coating comprises polyethylene, paraffin, oils, jellies, pastes, greases, waxes, polydimethylsiloxane, poly(tetrafluorethene), polyvinylidene fluoride, tetrafluoroethylene-perfluoroalkyl vinyl-ether copolymer, fluorinated ethylene propylene, poly(perfluorooctylethylene acrylate), polyphosphazene, polysiloxanes, silica, carbon black, alumina, titania, hydrated silanes, silicone, and/or mixtures thereof.

18. The gas-generating apparatus of claim 16, wherein the hydrophobic coating comprises poly(tetrafluorethene), tetrafluoroethylene-perfluoroalkyl vinyl ether copolymer, fluorinated ethylene propylene, poly(perfluorooctylethyl acrylate), or polyphosphazene.

19. The gas generating apparatus of claim 1, wherein the lattice structure is coated with a surfactant.

20. The gas generating apparatus of claim 19, wherein the surfactant comprises perfluorooctanoate, perfluorooctanesulfonate, ammonium lauryl sulfate, sodium laureth sulfate, alkyl benzene sulfonate, a sulfated or sulfonated fatty material, salts of sulfated alkyl aryloxypolyalkoxy alcohol, alkylbenzene sulfonates, sodium dodecyl benzenesulfonate, fluorosurfactants, sodium lauryl sulfate, sulfosuccinate blend, sodium dioctyl sulfosuccinate, sodium sulfosuccinate, sodium 2-ethylhexyl sulfate, ethoxylated acetylenic alcohols, high ethylene oxide octyl phenols, high ethylene oxide nonyl phenols, high ethylene oxide linear and secondary alcohols, ethoxylated amines of any ethylene oxide length, ethoxylated sorbitan ester, random EO/PO polymer on butyl alcohol, water soluble block EO/PO copolymers, sodium lauryl ether sulfate, and/or mixtures thereof.

21. The gas generating apparatus of claim 20, wherein the surfactant includes a cross-linking agent.

22. The gas generating apparatus of claim 1, wherein the lattice structure has a roughened surface.

23. The gas generating apparatus of claim 22, wherein the lattice structure exhibits Cassie-Baxter behavior.

24. The gas generating apparatus of claim 1, further comprises a second hydrophobic lattice structure between a wall of the reaction chamber and the gas output composite.

25. The gas generating apparatus of claim 1, further comprised of a filter between the catalyst and the gas output composite.

26. The gas generating apparatus of claim 25, wherein the filter is hydrophobic.

27. A gas-generating apparatus comprising:
a reaction chamber;
a fuel mixture within the reaction chamber, wherein the fuel mixture reacts to produce a gas in the presence of a catalyst; and
wherein the reaction chamber comprises a gas output composite comprising a lattice structure separating two gas-permeable, substantially liquid-impermeable membranes and the produced gas flows through at least one membrane into the gas output composite to be transported out of the gas-generating apparatus, and wherein at least one of the gas-permeable, substantially liquid-impermeable membranes hydrophobicity has been enhanced.

28. The gas-generating apparatus of claim 27, wherein both gas-permeable, substantially liquid-impermeable membranes hydrophobicity has been enhanced.

29. The gas-generating apparatus of claim 27, wherein the hydrophobicity of the gas-permeable, substantially liquid-impermeable membrane is enhanced by coating the gas-permeable, substantially liquid-impermeable membrane with a hydrophobic coating.

30. The gas generating apparatus of claim 29, wherein the hydrophobic coating comprises polyethylene, paraffin, oils, jellies, pastes, greases, waxes, polydimethylsiloxane, poly(tetrafluorethene), polyvinylidene fluoride, tetrafluoroethylene-perfluoroalkyl vinyl-ether copolymer, fluorinated ethylene propylene, poly(perfluorooctylethylene acrylate), polyphosphazene, polysiloxanes, silica, carbon black, alumina, titania, hydrated silanes, silicone, and/or mixtures thereof.

31. The gas-generating apparatus of claim 29, wherein the hydrophobic coating comprises poly(tetrafluorethene), tetrafluoroethylene-perfluoroalkyl vinyl ether copolymer, fluorinated ethylene propylene, poly(perfluorooctylethyl acrylate), and polyphosphazene.

32. The gas generating apparatus of claim 27, wherein the hydrophobicity of the gas-permeable, substantially liquid-impermeable membrane is enhanced by coating the gas-permeable, substantially liquid-impermeable membrane with a surfactant.

33. The gas generating apparatus of claim 32, wherein the surfactant comprises perfluorooctanoate, perfluorooctanesulfonate, ammonium lauryl sulfate, sodium laureth sulfate, alkyl benzene sulfonate, a sulfated or sulfonated fatty material, salts of sulfated alkyl aryloxypolyalkoxy alcohol, alkylbenzene sulfonates, sodium dodecyl benzenesulfonate, fluorosurfactants, sodium lauryl sulfate, sulfosuccinate blend, sodium dioctyl sulfosuccinate, sodium sulfosuccinate, sodium 2-ethylhexyl sulfate, ethoxylated acetylenic alcohols, high ethylene oxide octyl phenols, high ethylene oxide nonyl phenols, high ethylene oxide linear and secondary alcohols, ethoxylated amines of any ethylene oxide length, ethoxylated sorbitan ester, random EO/PO polymer on butyl alcohol, water soluble block EO/PO copolymers, sodium lauryl ether sulfate, and/or mixtures thereof.

34. The gas generating apparatus of claim 33, wherein the surfactant includes a cross-linking agent.

35. The gas generating apparatus of claim 27, wherein the substantially liquid-impermeable membrane has an exterior surface and the hydrophobicity of the gas-permeable, substantially liquid-impermeable membrane is enhanced by roughening the exterior surface of the gas-permeable, substantially liquid-impermeable membrane.

36. The gas generating apparatus of claim 35, wherein the substantially liquid-impermeable membrane exhibits Cassie-Baxter behavior.

37. The gas generating apparatus of claim 35, wherein the hydrophobicity of the substantially liquid-impermeable membrane is enhanced by about 10%.

38. A gas generating apparatus comprising:
a reaction chamber;
a fuel mixture within the reaction chamber, wherein the fuel mixture reacts to produce a hydrogen gas in the presence of a catalyst;
wherein the reaction chamber comprises a hydrogen output composite comprising a lattice structure separating two gas-permeable, substantially liquid-impermeable membranes and the produced gas flows through at least one membrane into the hydrogen output composite to be transported out of the gas-generating apparatus, and
wherein the fuel mixture has a surface tension and the gas-permeable, substantially liquid-impermeable membranes have a surface energy and the surface tension of the fuel mixture is greater than the surface energy of the gas-permeable, substantially liquid-impermeable membranes.

39. The gas generating apparatus of claim 38, wherein the surface tension of the fuel mixture is greater than 73 dynes/cm.

40. The gas generating apparatus of claim 38, wherein the surface tension of the fuel mixture is at least double that of the surface energy of the gas-permeable, substantially liquid-impermeable membrane.

41. A gas generating apparatus comprising:
a reaction chamber;
a fuel mixture within the reaction chamber, wherein the fuel mixture reacts to produce a hydrogen gas in the presence of a catalyst;
wherein the reaction chamber comprises a hydrogen output composite comprising a lattice structure separating two gas-permeable, substantially liquid-impermeable membranes and the produced gas flows through at least one membrane into the hydrogen output composite to be transported out of the gas-generating apparatus; and
an acidic filter located downstream of the hydrogen output composite to substantially remove basic contaminants from the produced hydrogen gas.

42. The gas generating apparatus of claim 41, wherein the acidic filter comprises perfluorinated sulfonic acid polymer.

43. The gas generating apparatus of claim 41, wherein the acidic filter removes greater than about 90% of the basic contaminants from the produced gas.

44. A gas-generating apparatus comprising:
- a reaction chamber for generating hydrogen gas from a fuel mixture;
- a storage chamber connected to the reaction chamber for storing hydrogen gas;
- a catalyst selectively in contact with the fuel mixture to produce hydrogen gas; and
- a membrane assembly disposed in the reaction chamber which comprises
  - a flexible barrier member which comprises a gas-permeable and substantially liquid-impermeable component, wherein the flexible barrier member forms a containment structure that defines a boundary of an internal space for collecting hydrogen gas in the reaction chamber such that hydrogen gas produced from the fuel mixture passes through the flexible barrier member into the internal space to separate hydrogen gas from the fuel mixture, and
  - a hydrogen conduit connected to the flexible barrier member which comprises
    - a first end in fluid communication with the internal space, and
    - a second end in fluid communication with the gas storage chamber.

45. The gas generating apparatus of claim 44, wherein the flexible barrier member further comprises a lattice.

46. The gas generating apparatus of claim 45, further comprising a filter disposed between the catalyst and the flexible barrier member.

* * * * *